United States Patent [19]

Gosling

[11] Patent Number: 5,455,464

[45] Date of Patent: Oct. 3, 1995

[54] METHOD AND APPARATUS FOR PROVIDING DYNAMICALLY CONFIGURABLE ELECTRICAL SWITCHES

[75] Inventor: James Gosling, Woodside, Calif.

[73] Assignee: FirstPerson, Inc., Mountain View, Calif.

[21] Appl. No.: 332,500

[22] Filed: Oct. 31, 1994

Related U.S. Application Data

[63] Continuation of Ser. No. 994,703, Dec. 22, 1992, abandoned.

[51] Int. Cl.[6] .................................................. G08C 19/00
[52] U.S. Cl. .................. 307/31; 340/825.71; 340/310.01
[58] Field of Search .................. 340/310 CP, 286.06, 340/286.07, 286.08, 286.09, 286.11, 825.69, 825.71, 825.75; 307/31, 112, 113, 116, 125, 126, 139, 140, 1, 3

[56] References Cited

U.S. PATENT DOCUMENTS

| | | | |
|---|---|---|---|
| 4,131,882 | 12/1978 | Hollabaugh et al. | 340/310 CP |
| 4,200,862 | 4/1980 | Campbell et al. | 340/825.69 |
| 4,490,625 | 12/1984 | Dilly | 307/116 |
| 4,746,809 | 5/1988 | Coleman et al. | 340/310 CP |
| 5,146,153 | 9/1992 | Luchaco et al. | 340/825.69 |
| 5,268,666 | 12/1993 | Michel et al. | 340/310 R |

*Primary Examiner*—William M. Shoop, Jr.
*Assistant Examiner*—Peter Ganjoo
*Attorney, Agent, or Firm*—Irell & Manella

[57] ABSTRACT

A digital wiring configuration comprises a switch control allowing a user to select a function to control a corresponding electrical device. A control unit couples electrical power to the electrical devices through power outlets. The control unit allows an operator to dynamically configure the switch controls to operate electrical devices at specified power outlets. Upon selection of a function on the switch control, the switch control transmits both a switch state, indicative of the function selected, and a switch identification that uniquely identifies that switch control. The control unit receives the switch state and the switch identification and generates a device identification uniquely identifying the power outlet corresponding to the control switch. The control unit transmits the device identification and the switch state to the power outlets. The corresponding power outlet is selected through the device identification and executes the function in accordance with the switch state.

9 Claims, 5 Drawing Sheets

METHOD AND APPARATUS FOR PROVIDING DYNAMICALLY CONFIGURABLE ELECTRICAL SWITCHES

This is a continuation of application Ser. No. 07/994,703, filed Dec. 22, 1992, and now abandoned.

BACKGROUND OF THE INVENTION

1. Field of the Invention

The method and apparatus of the present invention is related to the field of wiring and control for electrical power distribution. In particular, the method and apparatus of the present invention is related to the organization of building wiring such that the relationship between switches and the objects they control can be dynamically configured.

2. Art Background

Traditionally, building wiring, e.g. household and office wiring, consists of a design where each electrical device, such as a lamp, is plugged into an electrical socket. This electrical socket is separately wired to a specific wall switch which in turn is wired to a power source. Consequently, manipulating the wall switch either completes or breaks the electrical circuit between the power source and the electrical device. This traditional wiring scheme has several disadvantages. Running multiple wires to accommodate each outlet and switch pair can be expensive and is difficult to organize. Typically, a complex entanglement of wires results. Thus it is extremely difficult to locate specific individual wires running from the power source to a specific wall switch or from a specific wall switch to a specific electrical socket. Furthermore, as requirements change, it is inevitable that these individual wires will need to be located and rewired to accommodate new configurations. Moreover, connecting manually operable switches to a live power source is a potential safety hazard. Similarly, having the wall switches directly connected to a power source forces the power distribution to be more widespread than necessary. It is preferable to have the power distribution localized to ensure that the power distribution can be more easily controlled.

FIG. 1 illustrates a power wiring system of the prior art. The electrical devices are coupled to electrical sockets and each electrical socket is connected to a power source through an intermediate coupling to a wall switch. The wall switch controls the flow of power from the power source to the electrical socket. For example, when a wall switch is switched "off" the switch is open and no power flows through to the electrical socket and consequently no power flows to the electrical device applied to the socket.

As will be disclosed, the present invention overcomes the disadvantages of the prior art by providing a method and apparatus for organizing the wiring of electrical devices to a power source and for providing switches that are dynamically configurable to control different electrical sockets and electrical devices.

SUMMARY OF THE INVENTION

The present invention provides a method and apparatus for distributing electrical power from a power source to electrical devices controlled by dynamically configurable switch controls. The switch controls allow a user to select a function to control a corresponding electrical device. A control unit is provided which couples electrical power to a plurality of electrical devices through power outlets. The switch control transmits both a switch state, indicative of the function selected on the switch control, and a switch identification that uniquely identifies that switch control. The control unit comprises a receiver, an identification map and an encoder. The receiver on the control unit receives the switch state and switch identification transmitted from the switch control. The identification map, being dynamically configurable from an operator interface, generates a device identification based on the switch identification. In the encoder, the switch state and the device identification are encoded and transmitted. In a preferred embodiment, the switch state and device identification are transmitted on the power line. In an alternative embodiment, the switch state and device identification are transmitted by a communications link separate from the power.

Each power outlet coupled to the control unit receives the device command transmitted by the control unit. The power outlet acertains whether the device command is intended for the device coupled to the power outlet from the device command. If the device identification matches an identification previously assigned to the power outlet, then the power outlet executes the function identified by the switch state. Such a function may include turning on or off the power to a lamp device or regulating the power to the lamp device so as to dim the light.

BRIEF DESCRIPTION OF THE DRAWINGS

The objects features and advantages of the present invention will be apparent from the following detailed description of the preferred embodiment of the invention with references to the drawings in which.

DETAILED DESCRIPTION OF THE INVENTION

A method and apparatus for controlling power distribution among switches and electrical devices is disclosed. In the following description for purposes of explanation, specific numbers, materials, and configurations are set forth in order to provide a thorough understanding of the present invention. However, it will be apparent to one skilled in the art that the present invention may be practiced without the specific details. In other instances, well known devices are shown in block diagram form in order not to obscure the present invention unnecessarily.

Figure 1:
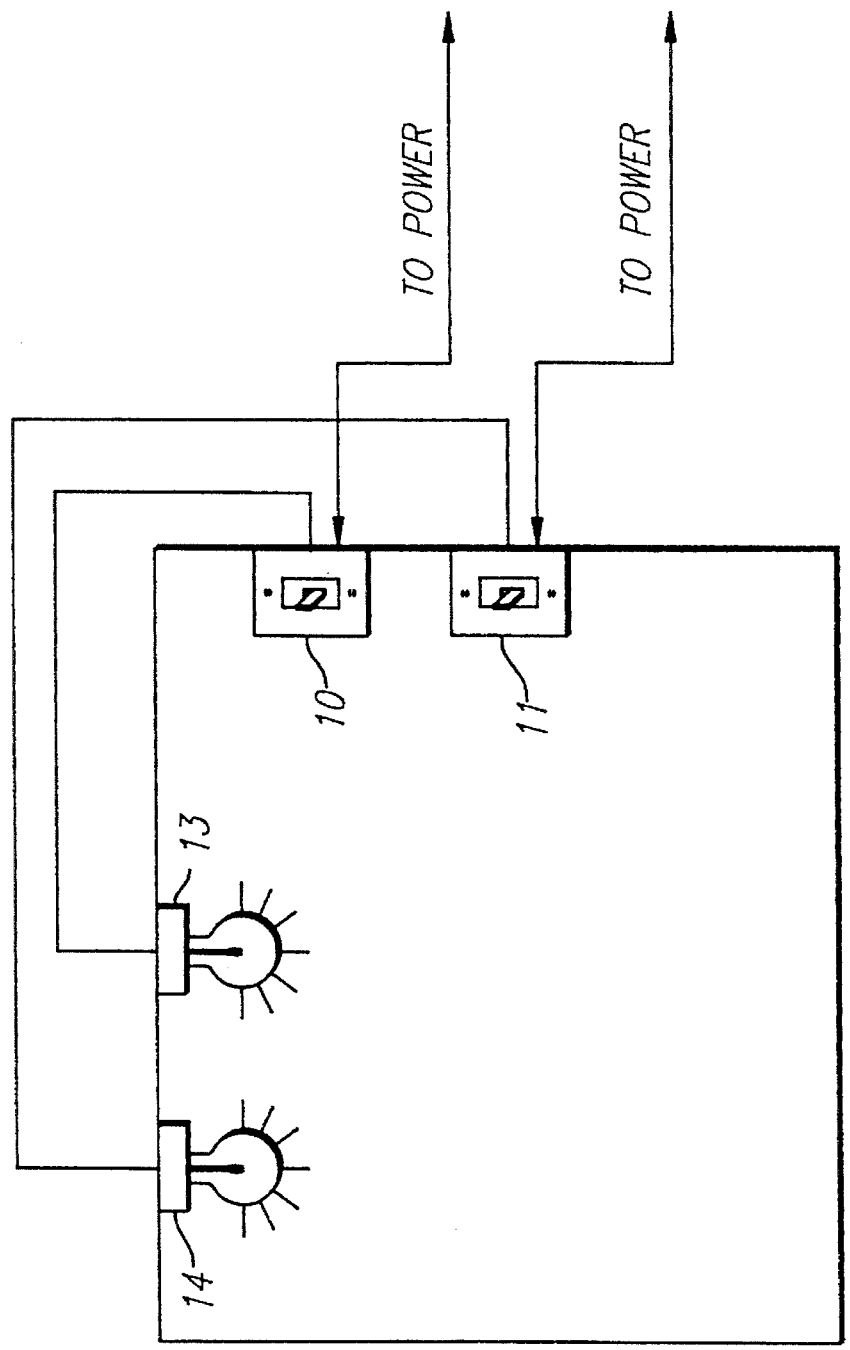
FIG. 1 illustrates the system configuration and wiring diagrams of the prior art.
Figure 2:
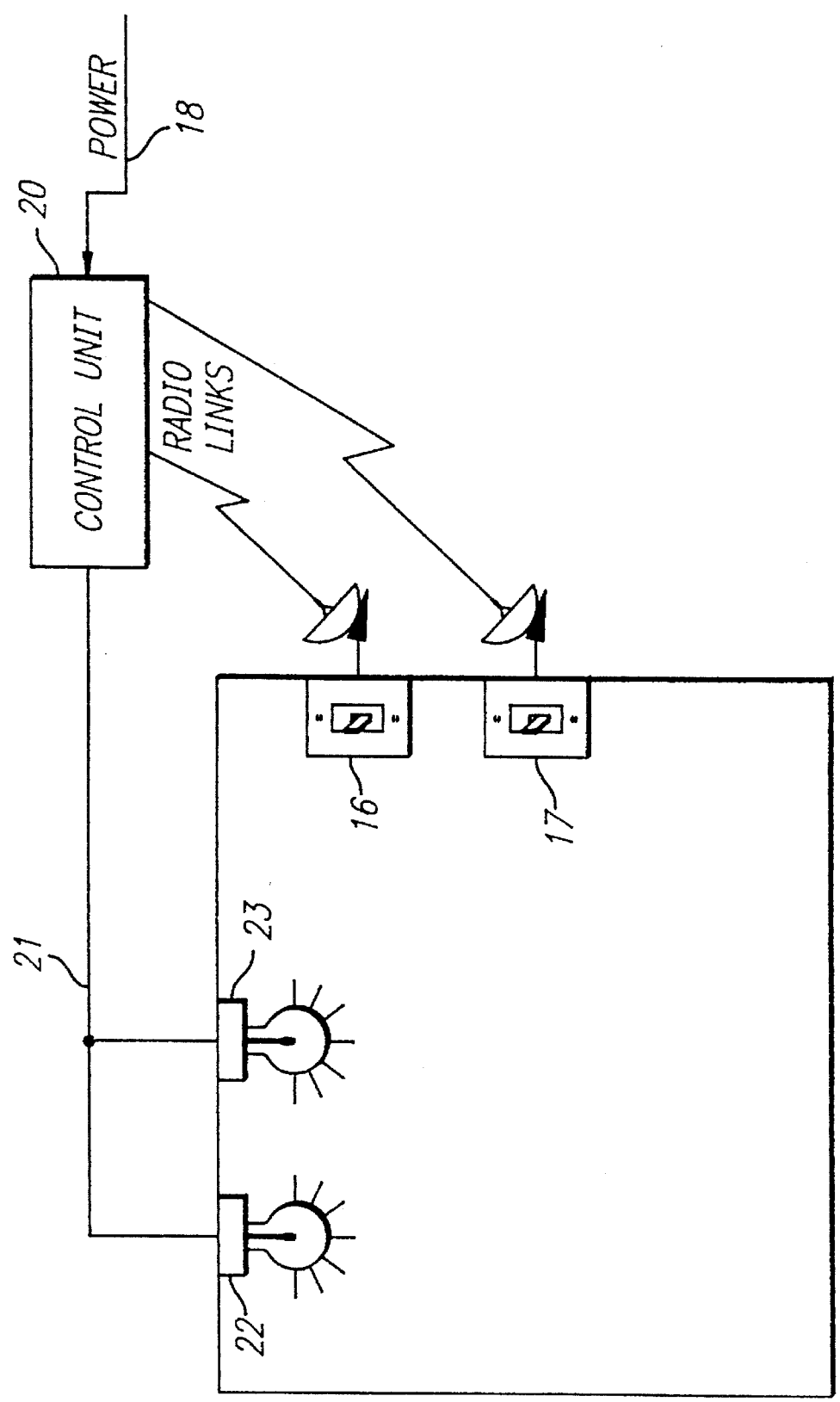
FIG. 2 illustrates a wiring configuration in accordance with the teachings of the present invention.

Referring to FIG. 2, a digital wiring configuration incorporating the teachings of the present invention is illustrated. In the present invention, switch controls are configured, in control unit 20, to control selected power outlets. For example, switch 16 may be selected to control power outlet 23, and switch 17 may be selected to control power outlet 22. Electrical power, from power source 18, is input to control unit 20. For illustration purposes, only one power line is shown from power source 18 to control unit 20. However, there could be a plurality of power lines coupled to power source 18. Preferably, when there is a plurality of power lines, there is one power line for every circuit breaker or fuse. For each power line, power is coupled from control unit 20 to power outlets as shown in FIG. 2.

In operation, when an operator toggles a switch, such as switches 16 or 17, the respective switch transmits a command to control unit 20. Control unit 20 receives the command and identifies the power outlet for which the switch controls. Control unit 20 then transmits the command, via the power line or a separate communications link, to the power outlet. Each power outlet receives the information and ascertains whether the command pertains to that power outlet. If the command is for the power outlet, then the power outlet executes the command. For example, a lamp is coupled to power outlet 23 which is controlled by switch 16. If an operator desires to turn on the lamp, the operator toggles switch 16. Upon being toggled, switch 16 transmits a command to control unit 20. Control unit 20 than identifies that switch 16 controls power outlet 23. Control unit 20 then modulates the command, including an identifier for power outlet 23, onto the power line. Upon receipt of the command, power outlet 23 recognizes the command identification, and then executes the command by allowing electrical power to flow through power outlet 23 to the lamp.

Figure 3:
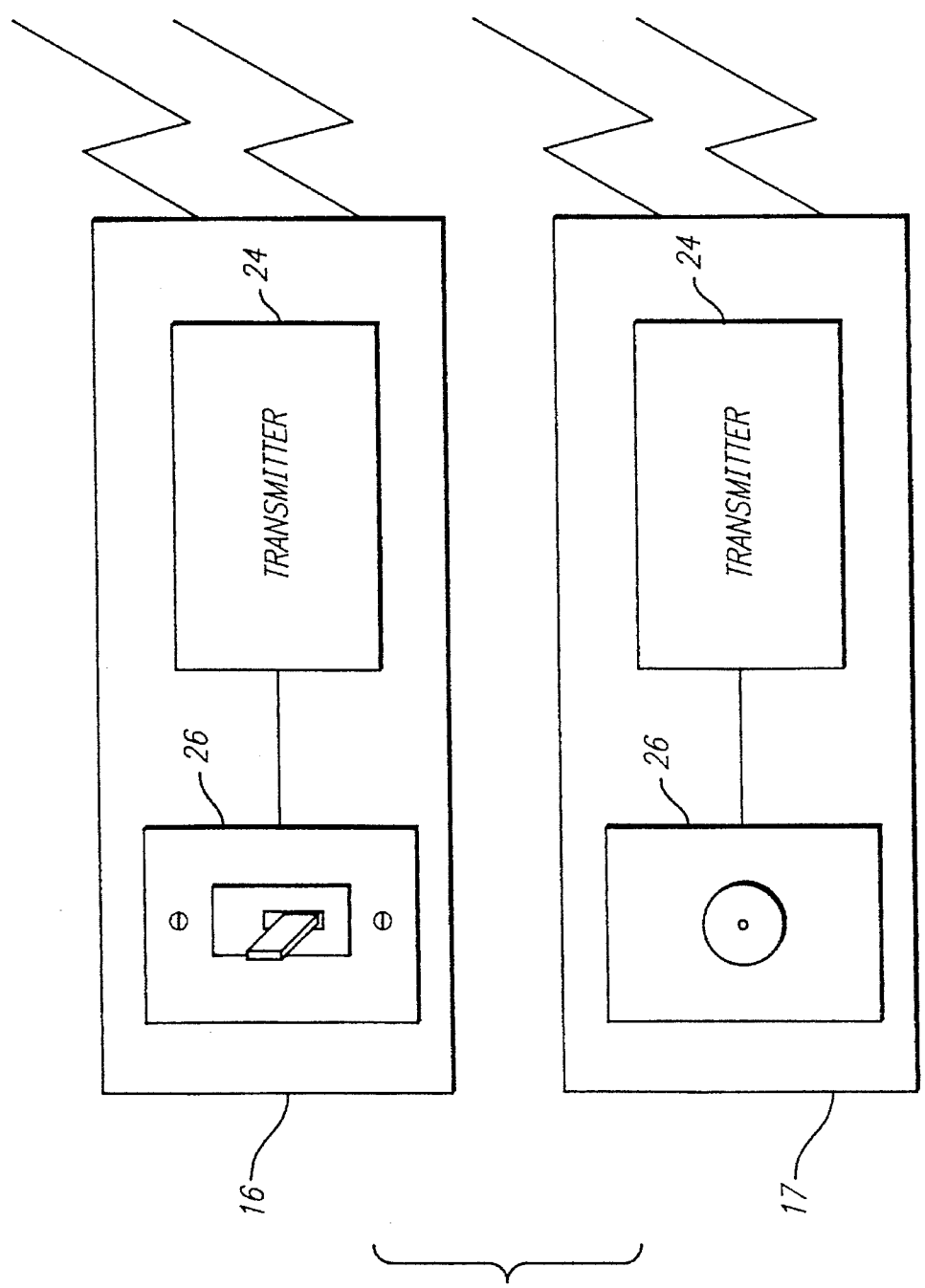
FIG. 3 is a block diagram illustrating two switch controls configured in accordance with the present invention.

Referring to FIG. 3, two switch controls configured in accordance with the present invention, such as switch controls 16 and 17, are illustrated. Switch controls 16 and 17 comprise a switch 26 and a transmitter 24. Switch 26 can comprise any manual switch configuration. For example, the switch 26 of switch control 16 comprises a standard single pole double throw switch. In a second configuration, switch 26 of switch control 17 comprises a dimming control switch. Although the present invention is described in conjunction with a single pole double throw and dimming switches, one will recognize any switch configuration could be used for the switch 26 without deviating from the scope and spirit of the present invention. The switch 26 generates a state signal, such as on, off or a value representing the level of light intensity. In addition, the switch 26 could generate any signal to represent a command to control an electrical device. Switch 26 of switch controls 16 and 17 are coupled to transmitter 24. The transmitter 24 accepts the state signal generated from the switch 26. In addition, transmitter 24 is receptive of the prior output state signal of switch 26 such that a change in the state signal output enables transmitter 24.

After an operator changes the state in switch controls 16 or 17, transmitter 24 generates a packet of digital data comprising bits of information identifying the switch control and the switch state. Each switch control is uniquely identified by a switch identification. The switch state is a digital representation of the output state signal from switch 26. The method for generating the packetized digital data depends upon the complexity of the switch 26. For example, if the switch 26 only generates an on/off command, then transmitter 24 needs only 1 bit of information for the switch state. Alternatively, if the state signal output is an analog signal representing the light intensity for dimming a lamp, then transmitter 24 digitizes the state signal and generates a string of digital bits representing the light intensity level. In this way, transmitter 24 generates a digital packet of data from any state signal output from switch 26. In addition to digitizing the state signal, transmiter 24 appends a switch identification onto the switch state data. The digitized packet, containing both the switch identification and the switch state, constitutes a switch command.

Transmitter 24, upon generation of the switch command, modulates the digitized packet for transmission to control unit 20. In the preferred embodiment, the switch command is transmitted by transmitter 24 via radio waves. However, one will recognize that any transmission medium, such as infra red transmission, or even lower frequencies transmitted by an electrical conductor, could be used. Transmitter 24 can employ any modulation technique suitable for the medium in which the switch command is being transmitted. For example, the digitized packet could be modulated by a phase, frequency or amplitude modulation schemes. Transmitter 24 is intended to represent a broad category of communication transmitters, including digital communications radio frequency transmitters, which are well known in the art and will not be described further.

Figure 4:
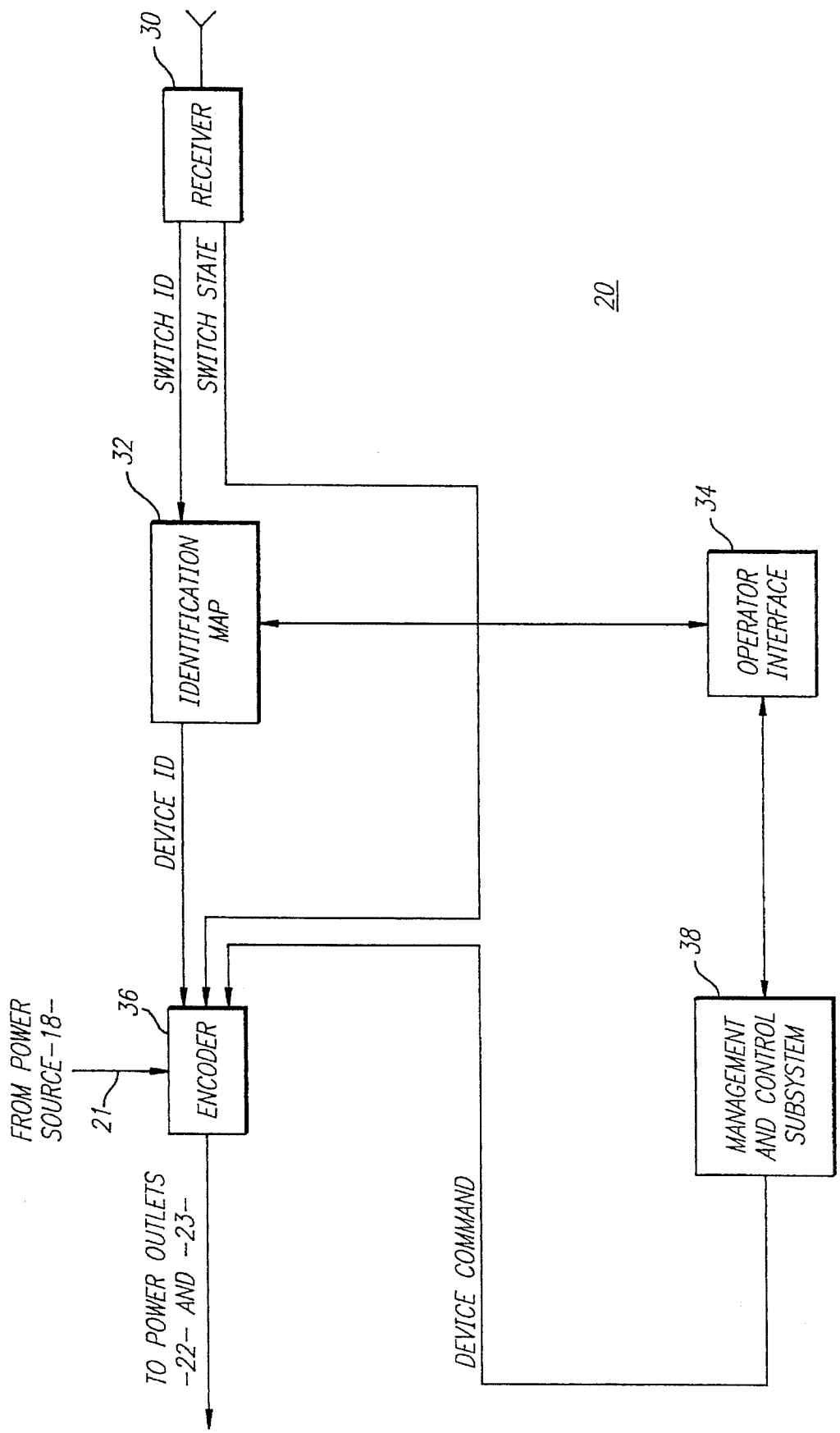
FIG. 4 is a block diagram illustrating a control unit configured in accordance with the present invention.

Referring to FIG. 4, a block diagram illustrating control unit 20 of the present invention is illustrated. Control unit 20 comprises receiver 30, identification map 32 and encoder 36. Receiver 30 is configured in accordance with transmitter 24. For example, if transmitter 24 of switch control 16 phase modulates the switch command on a carrier frequency of 50 mega hertz (Mhz), then receiver 30 of control unit 20 phase demodulates the switch command at a center carrier frequency of 50 Mhz. In addition to demodulating the switch command, receiver 30 parses the switch command data packet into its constituent switch identification and switch state components. Transmitter 24 and receiver 30 are intended to represent a broad category of communication systems which are also well known in the art and will not be described further. Within control unit 20, the switch state output of receiver 30 is coupled to encoder 36, and the switch identification output of receiver 30 is coupled to identification map 32.

Identification map 32 inputs the switch identification and, in turn, outputs a corresponding device identification. Identification map 32 is also coupled to an operator interface 34 as shown in FIG. 4. In this way, an operator enters information into control unit 20 to configure the identification map. For example, if an operator desired to assign switch control 16 to power outlet 23, then the operator enters such information through operator interface 34. Operator interface 34 is also intended to represent a broad category of man to machine interfaces, including video monitors and computer keyboards, which are also well known in the art and will not be described further. Identification map 32 can be a look-up table configurable from operator interface 34. In this way, switch identification is input to identification map 32 look-up table to obtain the device identification. Identification map 32 has a memory storage capacity to support all of the power outlets supported by control unit 20. In a preferred embodiment, control unit 20 is a portable computer. In this configuration, an operator interface is provided through menu driven software, and identification map 32 is stored on non-volatile memory.

Encoder 36 of control device 20 is coupled to receiver 30 and identification map 32 such that the switch state and device identification outputs are inputs to encoder 36. From the switch state and the device identification data, encoder 36 generates a device command comprising a single digital data packet. In a preferred embodiment, encoder 36 injects the device command onto the power line. Encoder 36 can utilize any modulation technique to encode the device command onto the power line. In an alternative embodiment, encoder 36 transmits the device command independent of the power line. Under this configuration, transmission of the device command is accomplished in a manner similar to the transmission of the switch command from switch controls 16 and 17 to control unit 20.

In a preferred embodiment, control unit 20 also contains power management and control subsystem 38. Power management and control subsystem 38 is a centralized control system that can perform more sophisticated operations like power consumption management, heat management and security operations. Power management and control subsystem 38 generates device commands for encoder 36 to perform a plurality of control functions. If control unit 20 is a computer, computer programs are executed to generate device commands to control the power outlets for various applications. For example, to reduce power consumption, power management and control subsystem 38 is programmed to disable or dim electrical devices attached to the power outlets during specific time periods.

Controlling of power at specified times eliminates wasting of power when those electrical devices are not in use. For example, in an office building, power management and control subsystem 38 generates a device command to dim or disable all the building lights on the office floors after a predetermined hour. In addition to controlling lights, heating and air conditioning units can be more efficiently managed. Heating and air conditioning units can be supplied limited power or even disabled when the building is not in use. Furthermore, building security is enhanced by power management and control subsystem 38 generating a device command to disable power outlets on office floors containing confidential information. Thus, it becomes much more difficult to gain unauthorized access to any of the devices on that floor when the electrical devices are disabled. In addition to the aforementioned applications for power management and control subsystem 38, one will appreciate the application possible with the configuration of the present invention.

Figure 5:
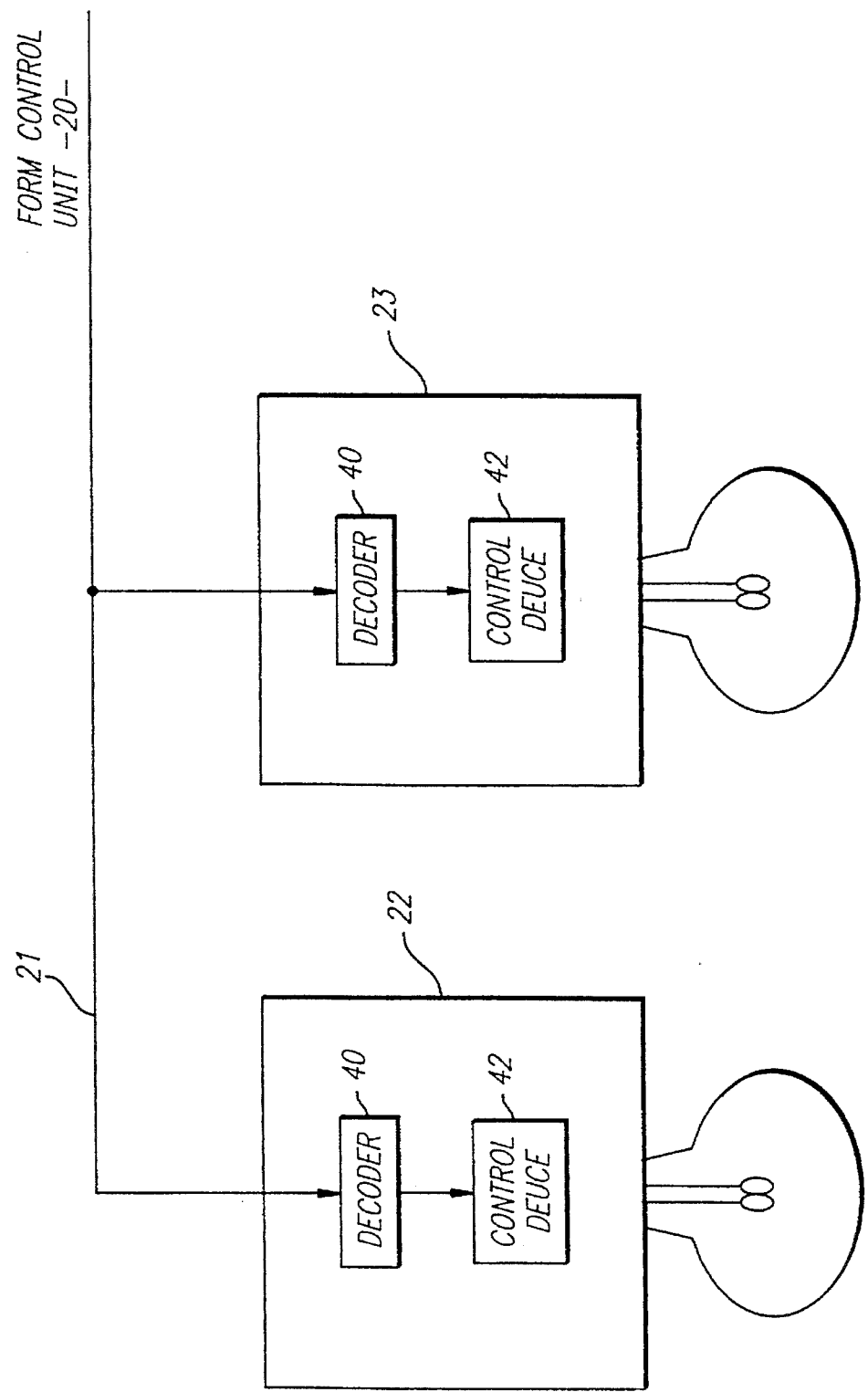
FIG. 5 is a block diagram illustrating two power outlets configured in accordance with the present invention.

Referring to FIG. 5, a block diagram of power outlets 22 and 23 configured in accordance with the present invention is illustrated. Generally, each power outlet of the present invention comprises a decoder 40 and a device control 42. In addition, each power outlet comprises a power outlet identification uniquely identifying the power outlet. In a preferred embodiment, the output of control unit 20 is the device command modulated on the electrical power, and it is transmitted on the power line to power outlets 22 and 23. Decoder 40 of power outlets 22 and 23 detects the device command on the power line. Decoder 40 decodes the device command to recover the device identification and switch state. The decoding method utilized by decoder 40 corresponds to the encoding technique employed by encoder 36 of control unit 20. For example, if the device command is modulated onto the power with a pulse width modulation scheme, then decoder 40 decodes in accordance with the same pulse width modulation scheme. After decoding the device command, decoder 40 determines whether the device command is intended for that power outlet by comparing the device identification in the device command with the power outlet identification.

In a second embodiment of the present invention, the device command is modulated independent of the power line. In this configuration, the device command is transmitted from control unit 20 to power outlets 22 and 23, via a wireless communications technique. In such a configuration, control unit 20 transmits the device command to each of the power outlets instead of encoding the device command on the power line. Preferably, control unit 20 transmits the device command to power outlets 22 and 23 on a different carrier frequency encoded for each power outlet. For example, power outlet 23 could be tuned to receive the device command on a first carrier frequency, and power outlet 22 could be tuned to receive the device command on a second carrier frequency. Such an encoding scheme to identify the selected power outlet has the advantage that each power outlet would only receive the device command intended for that power outlet. However, such an independent communications technique requires addition cost over transmitting the device command on the power line. In both the preferred and second embodiment, a microprocessor performs the functions of decoder 40.

If the device command is intended for the power outlet, then control device 42 of that power outlet executes a function identified by the switch state. For example, if the switch state contains information to turn off the lamp coupled to that power outlet, then control device 42 switches off the power from the power line resulting in an open circuit path to the lamp. If the switch state contains information to dim the lamp coupled to the power outlet, then control device 42 regulates the power output to the lamp resulting in dimming of the lamp. Although the present invention has been described in connection with on, off and dim control switch states, it will be appreciated that control device 42 could perform any function necessary for any particular application desired.

In a preferred embodiment, control unit 20 graphically displays the existing switch controls and the corresponding power outlets which each switch control operates. Existing switch control and power outlet pairs can then be changed or deleted through operator interface 34. For example, an operator may desire switch control 16 to control power outlet 23 instead of power outlet 22. Through a man to machine interface on operator interface 34, the operator selects the switch control 16 and power outlet 23 pair. After an operator enters a change or deletion, control unit 20 updates the identification map 32 to reflect the new configuration. Thus, the present invention allows changes and deletions of links between existing switch controls and power outlets to be done entirely within control unit 20 without the need to remove and reconfigure the physical wiring.

Furthermore, the present invention enables the addition of new switch controls to the system configuration without requiring any physical wiring. To add a new switch control, a switch control configured in accordance with the present invention is placed in the desired physical location. Through operator interface 34, an operator enters the new switch identification and selects at least one corresponding power outlet for the switch control to operate. Control unit 20 then updates identification map 32 to reflect the new switch control power outlet pair. Similarly, the present invention enables the addition of new power outlets to the system configuration without requiring extensive physical wiring. To install a new power outlet, an operator connects the new power outlet to an existing power line located in close physical proximity to the desired location of the new power outlet. A new or existing switch control is then selected to operate the power outlet. Through operator interface 34, an operator enters the new power outlet identification and the corresponding switch control. Consequently, addition of switch controls and power outlets resulting in new system configurations is accomplished with minimal wiring and expense.

Although the present invention has been described in terms of a preferred embodiment, it will be appreciated that various modifications and alterations might be made by those skilled in the art without departing from the spirit and scope of the invention. The invention should therefore be measured in terms of the claims which follow.

I claim:

1. A digital wiring system to control electrical power coupled to a plurality of electrical devices, said digital wiring system comprising:

a plurality of switch control means for controlling said electrical devices, each one of said switch control means comprising a switch for selecting among a plurality of switch states, and a transmitter means for transmitting a switch command, said switch command uniquely identifying said selected switch state and said switch control means;

control unit means for generating a device command in response to said switch command, said control unit means comprising:

receiver means for receiving said switch command transmitted from said switch control means, map means coupled to said receiver means for generating a device identification, said map means specifying those electrical devices which are controlled by each one of said switch control means, and said map means generating said device identification so as to identify each electrical device that is controlled, according to said specification, by the switch control means identified in said switch command, operator interface means not restricted by predetermined selection rules for dynamically configuring said map means in response to an operator selection, so as to modify said specification of which ones of said electrical devices are controlled by each one of said switch control means, encoder means coupled to said identification map means and said receiver means for generating a device command, said device command comprising said device identification and further specifying said selected switch state; and a plurality of power outlet means coupled to said control unit means for providing said electrical power to said electrical devices in accordance with said device command, each one of said power outlet means being associated with one of said electrical devices, and each one of said power outlet means comprising:

decoding means for receiving and decoding said device command, and device control means coupled to said decoding means for providing said electrical power to said associated electrical device in accordance with said selected switch state when said associated electrical device corresponds to said device identification of said device command.

2. A digital wiring system for controlling electrical power coupled to a plurality of electrical devices as claimed in claim 1 wherein said control unit means comprises a computer.

3. A digital wiring system for controlling electrical power coupled to a plurality of electrical devices as claimed in claim 1 wherein said decoding means comprises a microprocessor for controlling said electrical power flow to said electrical device in accordance with said switch state.

4. A digital wiring system for controlling electrical power coupled to a plurality of electrical devices as claimed in claim 1 wherein said functions selectable from said switch control means comprises turning said electrical device on, off, and dimming said electrical power to said corresponding electrical device.

5. A digital wiring system for controlling electrical power coupled to a plurality of electrical devices as claimed in claim 1 wherein said transmitter transmits said switch state to said control unit means by radio frequency communications.

6. A digital wiring system for controlling electrical power coupled to a plurality of electrical devices as claimed in claim 1 wherein said power outlet means receives said switch state and said device identification encoded on said electrical power.

7. A method for controlling electrical power coupled to a plurality of electrical devices, said method comprising the steps of:

providing a plurality of power outlets, each one of said power outlets being coupled to one of said plurality of electrical devices;

providing a control unit comprising an identification map;

connecting said electrical power from a power source to each of said power outlets;

providing a plurality of switch means for controlling said electrical devices, each one of said switch means being able to transmit at least one selected function and a switch identification uniquely identifying said switch means;

dynamically generating said identification map under control of a selective operator interface not restricted by predetermined selection rules, said map correlating each one of said switch means to at least one corresponding electrical device;

selecting a function on one of said switch means to control said electrical power for said corresponding electrical device;

transmitting said selected function and said switch identification from said switch means to said control unit;

generating a device identification from said switch identification, to identify said corresponding electrical device using said identification map of said control unit;

transmitting said selected function and said device identification from said control unit to each power outlet; and executing said selected function when said device identification matches said electrical device that is associated with said power outlet, thereby controlling said electrical power for said associated electrical device.

8. A method for controlling electrical power coupling to a plurality of electrical devices as claimed in claim 7 wherein the step of transmitting said switch state and said device identification comprises the step of modulating said switch state and said device identification on said electrical power.

9. A method for controlling electrical power coupling to a plurality of electrical devices as claimed in claim 7 wherein the step of transmitting said switch state and said device identification comprises the steps of modulating said switch state and said device identification and transmitting said switch state and said device identification via radio communications link.

* * * * *